United States Patent
Fimpel et al.

(10) Patent No.: US 12,128,516 B2
(45) Date of Patent: Oct. 29, 2024

(54) TOOL AND METHOD FOR MEASURING A TOOL FORCE

(71) Applicant: Kistler Holding AG, Winterthur (CH)

(72) Inventors: Tobias Fimpel, Ermatingen (CH); Gunnar Keitzel, Winterthur (CH); Denis Kohler, Neftenbach (CH)

(73) Assignee: Kistler Holding AG, Winterthur (CH)

( * ) Notice: Subject to any disclaimer, the term of this patent is extended or adjusted under 35 U.S.C. 154(b) by 534 days.

(21) Appl. No.: 17/278,752

(22) PCT Filed: Oct. 7, 2019

(86) PCT No.: PCT/EP2019/077063
§ 371 (c)(1),
(2) Date: Mar. 23, 2021

(87) PCT Pub. No.: WO2020/074434
PCT Pub. Date: Apr. 16, 2020

(65) Prior Publication Data
US 2022/0032416 A1    Feb. 3, 2022

(30) Foreign Application Priority Data
Oct. 10, 2018 (EP) .................... 18199541

(51) Int. Cl.
*B23Q 17/09* (2006.01)
*B23B 25/06* (2006.01)

(52) U.S. Cl.
CPC .......... *B23Q 17/0966* (2013.01); *B23B 25/06* (2013.01); *B23Q 2717/003* (2013.01)

(58) Field of Classification Search
CPC ..... B23B 29/04; B23B 29/046; B23B 29/043; B23B 25/06; B23B 2260/128;
(Continued)

(56) References Cited

U.S. PATENT DOCUMENTS 2,054,787 A * 9/1936 Beavers ............... B23Q 1/4828
73/104
3,497,935 A * 3/1970 Bowling ................. B23B 27/04
407/108

(Continued)

FOREIGN PATENT DOCUMENTS

CN    102179705 A    9/2011
CN    103111643 A *  5/2013
(Continued)

OTHER PUBLICATIONS

CN-106363461-A Machine Translation (Year: 2023).*
(Continued)

*Primary Examiner* — Nicole N Ramos
(74) *Attorney, Agent, or Firm* — Dority & Manning, P.A.

(57) ABSTRACT

A tool received in a tool holding fixture of a tool holder includes a tool shank defining a recess and a force sensor arranged in the recess. During operation of the tool, the force sensor measures a tool force exerted by the tool shank onto the tool holder. A method for measuring a tool force by using the tool includes the steps of: arranging the force sensor between the tool shank and the tool holding fixture; clamping the force sensor by means of a clamping device of the tool holding fixture; operating the tool; and using the force sensor to measure the tool force exerted by the tool shank onto the tool holder.

12 Claims, 5 Drawing Sheets

(58) Field of Classification Search
CPC ... B23B 2270/483; B23B 27/04; B23Q 15/12; B23Q 15/14; B23Q 15/16; B23Q 15/18; B23Q 17/0995; B23Q 17/0966; B23Q 17/0952; B23C 2260/76; B23C 2260/128
See application file for complete search history.

(56) References Cited

U.S. PATENT DOCUMENTS

| | | | | |
|---|---|---|---|---|
| 3,826,131 | A * | 7/1974 | Pritschow | B23Q 17/0966 73/862.623 |
| 3,872,285 | A * | 3/1975 | Shum | B23Q 15/00 73/104 |
| 4,080,854 | A * | 3/1978 | Peterson | B23B 29/04 82/158 |
| 4,555,955 | A * | 12/1985 | Morgan | G01L 5/1627 73/862.06 |
| 4,671,147 | A * | 6/1987 | Komanduri | B23Q 17/0966 73/104 |
| 4,899,594 | A * | 2/1990 | Wolfer | B23Q 17/0966 73/104 |
| 4,989,457 | A * | 2/1991 | Berger | G01L 5/045 73/862.541 |
| 5,168,758 | A | 12/1992 | Peter | |
| 5,251,522 | A * | 10/1993 | Chin-Long | B23Q 17/09 82/134 |
| 5,662,015 | A * | 9/1997 | Bassett | B23B 29/0341 82/158 |
| 5,824,917 | A * | 10/1998 | Kluft | G01L 5/0004 73/DIG. 4 |
| 6,661,157 | B1 * | 12/2003 | Lundblad | F16F 15/02 310/326 |
| 6,694,213 | B2 * | 2/2004 | Claesson | F16F 15/005 82/158 |
| 7,234,379 | B2 * | 6/2007 | Claesson | B23Q 11/0039 82/158 |
| 7,340,985 | B2 * | 3/2008 | Claesson | B23Q 11/0032 82/158 |
| 7,500,398 | B2 * | 3/2009 | Tschanz | G01L 5/0004 73/856 |
| 7,883,303 | B2 * | 2/2011 | Tang | B23Q 17/0985 408/8 |
| 8,726,740 | B1 * | 5/2014 | Mekid | G01L 5/167 73/862.041 |
| 9,751,180 | B2 * | 9/2017 | Jayr | G01L 5/1627 |
| 10,126,184 | B2 | 11/2018 | Kohler et al. | |
| 2009/0165621 | A1 * | 7/2009 | Tzschentke | B23Q 1/34 83/370 |
| 2009/0234490 | A1 * | 9/2009 | Suprock | B23B 31/02 408/116 |
| 2016/0045994 | A1 | 2/2016 | Jayr et al. | |
| 2017/0122823 | A1 | 5/2017 | Thiel | |
| 2018/0264614 | A1 | 9/2018 | Cord et al. | |

FOREIGN PATENT DOCUMENTS

| | | | | |
|---|---|---|---|---|
| CN | 102873353 | B * | 2/2015 | |
| CN | 106363461 | A * | 2/2017 | ......... B23Q 17/0966 |
| CN | 106584210 | A * | 4/2017 | ............. B23B 25/06 |
| CN | 107322368 | A * | 11/2017 | ......... B23Q 17/0952 |
| CN | 207888246 | U | 9/2018 | |
| DE | 3908175 | A1 | 9/1989 | |
| DE | 102007001620 | A1 * | 7/2008 | ............. B23Q 15/18 |
| DE | 102013005555 | B3 | 10/2014 | |
| EP | 0433535 | A1 | 6/1996 | |
| JP | S 47-012583 | U | 10/1972 | |
| WO | WO-0009289 | A1 * | 2/2000 | ......... B23Q 17/0971 |

OTHER PUBLICATIONS

CN-107322368-A Machine Translation (Year: 2023).*
CN-106584210-A Machine Translation (Year: 2023).*
CN-102873353-B Machine Translation (Year: 2023).*
DE-102007001620-A1 Machine Translation (Year: 2023).*
CN-103111643-A Machine Translation (Year: 2023).*
EPO Office Action with partial translation, May 6, 2022, 9 pages.
Translation of CN Office Action, Mar. 2, 2022, 10 pages.
Translation of JP Office Action, Mar. 10, 2022, 2 pages.
ISR of Jan. 9, 2020 and Translation, 11 pages.
Written Opinion of Searching Authority and Translation, 4 pages.

* cited by examiner

TOOL AND METHOD FOR MEASURING A TOOL FORCE

CROSS-REFERENCE TO RELATED APPLICATIONS

The present application claims priority to patent application serial number PCT/EP2019/077063, filed on Oct. 7, 2019, which patent application is hereby incorporated herein in its entirety by this reference for all purposes.

FIELD OF THE INVENTION

The present invention relates to a tool that comprises a tool shank received in a tool holding fixture of a tool holder. The invention also relates to a force sensor that measures a tool force. Further, the invention relates to a method for measuring a tool force using such tool and such force sensor.

BACKGROUND OF THE INVENTION

In the manufacturing of workpieces by means of machine tools it is often desired to measure the forces acting on a tool that is held in a tool holder of the machine tool. Generally, these so-called tool forces act multi-dimensionally. In a lathe, for example, the cutting tool is subject to the cutting force that the workpiece exerts onto the cutting tool as well as to a feed force.

These tool forces may be measured by dynamometers. However, dynamometers are disadvantageous because of their large dimensions so that they their presence in the machine room is often inconvenient and it is furthermore not possible to install them at any position desired in a machine tool. Moreover, the manufacturing and procurement costs of dynamometers are relatively high.

Such tool forces may also be measured by using strain gauges. However, due to their principle of function strain gauges require a certain flexibility of the machine parts, especially tools, to be measured which is undesirable in precision machining of workpieces. Therefore, the use of strain gauges results in low dynamic resolution of the measurements.

Furthermore, a torque wrench may be used for measuring the clamping force exerted on a tool shank by a tool holding fixture of a tool holder. The actual clamping forces, however, depend on the coefficients of friction of the surfaces that are moved against each other and may therefore be different from the amounts given by the torque wrench so that it is not possible to determine the clamping force precisely.

The document DE102013005555B3 discloses a measuring plate comprising thrust and pressure sensors attached thereto by which, for example, the thrust and pressure forces acting on a bearing surface of a press may be measured. For this purpose, one thrust sensor and one pressure sensor are each arranged on top of one another and are braced by means of a pressure piece in a hollow-cylindrical recess of the measuring plate against the bottom of the measuring plate.

This arrangement has the disadvantage that the measuring plate introduces an additional mass, i.e. inertia, into the measuring system and, therefore, is unsuitable for highly dynamic applications.

EP0433535A1 discloses a multi-component force measuring arrangement without a measuring plate for automatic measurement of forces acting in machine tools, such as a feed force, a passive force and a main cutting force, in order to detect tool abrasion or tool breakage. In this arrangement, the multi-component force transducer is arranged in a pocket-shaped recess in the machine slide of an automatic lathe or in a groove between two machine parts. The force transducer may be wedge-shaped and may be pretensioned by means of a pressure wedge. This has the disadvantage that errors in the force measurement may arise due to the geometry of the machine slide and that, furthermore, the mass of the machine slide has a disadvantageous effect on the dynamic properties of the measuring arrangement.

OBJECTS AND SUMMARY OF THE INVENTION

It is the object of the present invention to provide a tool belonging to the technical field mentioned in the beginning and a method enabling a more precise and dynamic measurement of tool forces. In particular, a measurement of the machining forces of lathes is provided that is suitable for industrial applications.

This object has been solved by the features defined in the description that follows. According to the invention, a tool comprises a tool shank received in a tool holding fixture of a tool holder. The tool further comprises a force sensor arranged in a recess at the tool shank, and when the tool is in operation the force sensor measures a tool force exerted by the tool shank onto the tool holder.

A force sensor that is arranged according to the present invention allows direct measurement of tool forces while the tool is in operation. The force sensor is arranged at the tool shank and therefore it is possible to measure the force directly. In this way, both the precision and the dynamics of the force measurement are improved. Vibrations may be measured much more precisely, for example, because the force sensor only detects the small mass of the tool shank while it doesn't detect the much larger mass of a tool holder. Also, in this way it is possible to measure smaller forces.

Preferably, the force sensor is arranged either in a recess in the tool shank or in a recess of the tool holder or in a recess in an intermediate piece. The intermediate piece is inserted between the tool shank and the tool holder. A force sensor may of course be arranged both at the tool shank and the tool holder and further at the intermediate piece.

For the purposes of the present invention, "arranged at the tool shank" means that the force sensor is arranged in close proximity to the tool shank and at an interface between the tool shank and the tool holder. The force sensor may be arranged on the side of the tool shank or on the side of the tool holder. The force sensor may also be arranged in an intermediate piece between the tool shank and the tool holder.

The force sensor is adapted to measure a tool force of any kind, such as for example a compressive force, a bending force, a torsion force, a cutting force or a feed force of the tool shank. The force sensor has a contact surface and measures the tool force acting onto this contact surface. The contact surface provides mechanical contact between the force sensor and the tool shank.

Preferably, a force sensor having small dimensions is used. A diameter of the force sensor may be less than 15 mm, preferably less than 10 mm, and particularly preferred 7 mm or less. A thickness of the force sensor may be less than 7 mm, preferably less than 5 mm, and particularly preferred 3 mm or less. A volume of the force sensor may preferably be less than 500 mm$^3$, particularly preferred less than 300 mm$^3$, and more particularly 100 mm$^3$ or less.

A force sensor having small dimensions has the advantage of easy attachment at the tool shank or at the tool holder or at the intermediate piece. In addition, such a force sensor may also be used with a tool that has a small tool shank or a small tool holder or a small intermediate piece.

Preferably, the tool shank or the tool holder or the intermediate piece has an angular cross-section, in particular a rectangular or square-shaped cross-section.

The dimensions of the recess may be such that the recess is able to accommodate the force sensor in a tension-free and/or accurately fitting manner. In some areas, the force sensor may protrude beyond the recess so that the tool shank and the tool holder, or the tool shank and the intermediate piece are in mechanical contact with each other solely by means the contact surface of the force sensor and so that a force component of the tool force measured is 100%. This has the advantage that the force measurement is effected with maximum sensitivity since no component of the force acts in a force shunt outside of the force sensor 30.

However, the force sensor may also be completely accommodated within the recess so that the tool shank and the tool holder, or the tool shank and the intermediate piece are in mechanical contact with each other by means of a common contact surface formed by the force sensor and the tool shank or by a common contact surface formed by the force sensor and the tool holder or by a common contact surface formed by the force sensor and the intermediate piece and so that a force component of the tool force measured is less than 100%. This has the advantage that the force measurement is effected with high mechanical stability and high natural frequency because mechanical bending of the tool shank is avoided.

When the tool is in operation and in particular when the tool is clamped in a tool holding fixture of a tool holder, the force sensor is of course no longer free of tension and, consequently, the arrangement thereof in a recess of the tool shank or of the intermediate piece is no longer free of tension.

In a particular embodiment the tool is a cutting tool.

Generally, cutting tools are arranged in a fixed and rotation-free manner, for example in a tool holder that is free from rotation, so that a force measurement may be carried out particularly easily.

Cutting tools means machining tools as used in turning machines and/or lathes, for example. In this case, the cutting tool itself does not rotate but the workpiece to be machined by the cutting tool is rotated.

It is of course also possible to use other tools, such as for example drills or milling heads. Usually, tools of this type have a tool shank that is rotationally symmetrical because such tools are usually rotated and are arranged in a tool holder that itself rotates. Consequently, the force sensor measures not only the tool force but also a centripetal force caused by the rotation of the force sensor.

It may also be conceived to use tools with undefined cutting edge, such as grinding tools.

For example, the tool holder may be the machine slide of a turning machine and/or a lathe, a drill chuck or a holding fixture of a milling head.

In a particular embodiment, the tool holding fixture of the tool holder comprises a clamping device for clamping the tool shank. In particular, the clamping device comprises a wedge. In this way, it is particularly easy to secure a tool shank of the tool in the tool holding fixture of the tool holder. A wedge has the advantage that it may be clamped in a vertical direction, for example, and that it may further exert a horizontal force onto the tool shank.

In a particular embodiment, the force sensor is a piezoelectric force sensor. Piezoelectric force sensors are known per se and are commercially available. They are characterized by high dynamics and precision.

It is advantageous to use a type 9131 B force sensor from Kistler company, which owns U.S. Pat. No. 10,126,184, which is hereby incorporated in its entirety herein by this reference for all purposes.

Alternatively, it would also be possible to use strain gauges or dynamometers if this is possible in view of the installation space.

In a particular embodiment the force sensor is a multi-axis force sensor.

In this way, it is possible to measure tool forces that act in different directions at the same time. For example, in this way feed forces of the tool may be measured in addition to the cutting forces or machining forces, respectively, that act on workpieces during a cutting or machining operation. Thus, also a clamping force may be measured, for example, when the tool shank is clamped in a tool holder.

However, for measuring tool forces acting in different directions at the same time it would of course also be possible to arrange several force sensors in different directions each of which measures the tool force in only one direction.

In a particular embodiment, the force sensor is configured for transmitting measured signals to an evaluation device. For example, the force sensor may comprise a cable or radio link by which the measured signals may be transmitted to an evaluation device.

In this way, an evaluation device may for example recognize whether permissible force values are exceeded and whether the tool and/or tool holder is at a risk of being damaged. From of a sudden decrease of the cutting forces, for example, the evaluation device may infer breakage of the tool. In every case, the evaluation device may use this information for suitably controlling a machine tool control.

However, in the case of a rotating tool the evaluation device may also calculate a centripetal force from the measured signal so as to determine the remaining tool forces in a more precise manner. It is of course also possible to infer a rotational speed of the tool from a centripetal force measured.

In a particular embodiment, the force sensor is configured to enable the monitoring of signals measured by the force sensor in real time. For example, the force sensor may comprise a cable or radio link by which the measured signals may be transmitted to an evaluation device, wherein the bandwidth of the cable or radio link is greater than the dynamics of the measured signals so that the measured signals may be monitored instantly.

This has the advantage that in particular in an automated production it is possible to quickly react to changes in tool forces. For example, it is possible to quickly recognize and replace broken tools. The high accuracy and dynamics of the force measurement according to the present invention reduces the number of false alarms.

In the context of the present invention, monitoring means that the measured signals are compared to one or more predetermined threshold values or to predefined patterns so that one or more output and/or decision signals may be generated in real time. This may be for example performed by an evaluation device.

Alternatively and/or in addition, it is possible to analyze and evaluate the measured signals at a later time.

Preferably, the tool also comprises an evaluation device. In this case, the signals are transmitted from the force sensor to the evaluation device, for example by a cable or radio link. In addition, a charge amplifier and/or a digitizing device may be arranged between the force sensor and the evaluation device.

The evaluation device may enable monitoring of the tool clamping process. Furthermore, machining processes may be analyzed and optimized. Different tools may be evaluated and compared. The monitoring of machining processes may also be used for quality management.

In a particular embodiment of the tool the force sensor is pretensioned by a pretensioning force.

This pretensioning force enables the measurement of "negative" forces, i.e. forces that counteract the pretensioning force which could not be measured without the pretensioning force, by means of the force sensor. In addition, the pretension may be adjusted so that the force sensor is in a highly linear range, i.e. in a linear measuring range, over the entire measuring range desired.

Furthermore, the force sensor may be adapted to measure the pretensioning force when the tool is at rest, i.e. not in operation. When this pretensioning force is known the above-mentioned tool forces such as a compressive force, a bending force, a torsion force, a centripetal force caused by tool rotation, a cutting force, a feed force or a combination thereof may be measured during operation.

In a particular embodiment of the tool the pretensioning force is adjustable.

Thus, it is for example possible to set the range of the force measurement.

In a particular embodiment of the tool the pretensioning force is equal to a clamping force exerted by a clamping device of the tool holding fixture onto the force sensor.

A clamping force exerted by the tool holding fixture onto the tool shank may be very easily provided by means of a clamping device of the tool holding fixture. Since always, and not only in this embodiment, the force sensor is arranged between the tool holding fixture and the tool shank, the clamping force also acts onto the force sensor. If the force sensor was arranged between the tool holding fixture and the tool shank in a tension-free manner prior to clamping, the clamping force would now be equal to the pretensioning force of the force sensor. Thus, the force sensor is able to measure the clamping force of the clamping device.

Particularly in the case when the pretensioning or clamping force is known it is possible to determine the other tool forces mentioned above by using the tool according to the invention.

In a particular embodiment of the tool, there is a form fit and/or force fit between the force sensor and the tool shank and/or the tool holding fixture.

This form fit and/or force fit may be produced particularly easily by means of a clamping device, for example. In addition, a form fit and/or force fit enables tool forces to be measured in different directions.

In a particular embodiment of the tool the form fit and/or force fit is reversible.

A reversible form fit and/or force fit is particularly intended to mean that the form fit and/or force fit may be irreversibly released.

Such reversible form fit and/or force fit may be produced particularly easily by means of a clamping device, for example. For example, it enables the tool to be quickly exchanged by opening, i.e. loosening, the clamping device, changing the tool and then again closing, i.e. tensioning, the clamping device.

In a particular embodiment of the tool the form fit and/or force fit is reproducible.

Such reproducible form fit and/or force fit may be produced particularly easily by means of a clamping device, for example.

In particular, a reproducible form fit and/or force fit is intended to mean that the form fit and/or force fit produces a reproducible clamping force.

Furthermore, the invention also relates to a method for measuring a tool force using a tool that comprises a tool shank received in a tool holding fixture of a tool holder; wherein the tool also comprises a force sensor; said method comprising the steps of: arranging a force sensor between the tool shank of the tool and the tool holding fixture of the tool holder; and clamping the force sensor by means of a clamping device of the tool holder; wherein during operation of the tool the force sensor measures the tool force exerted by the tool shank onto the tool holder.

In a preferred embodiment, the method additionally comprises the step of calibrating.

Further advantageous embodiments and combinations of features of the invention will become clear from the following detailed description and the claims in their entirety.

BRIEF DESCRIPTION OF THE DRAWINGS

Exemplary embodiments are explained in the drawings in which.

Throughout the figures, the same parts are principally designated by the same reference numbers.

DETAILED DESCRIPTION OF EXEMPLARY EMBODIMENTS

Figure 1:
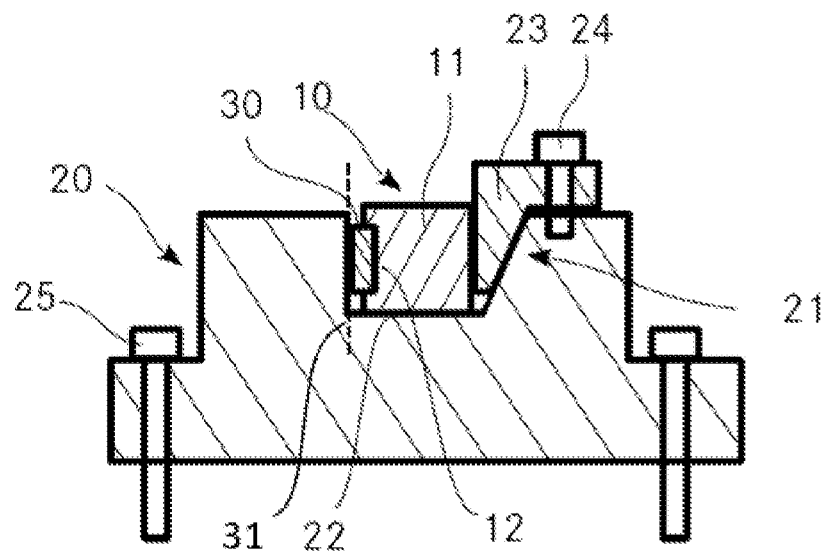
FIG. 1 shows a cross-section taken in the direction of the arrows A-A in FIG. 2 of the first embodiment of the tool according to the invention having a recess for the pressure sensor located in the tool shank wherein solely a contact surface of the pressure sensor abuts on the tool holder.

FIGS. 1 to 10 show a plurality of embodiments of a tool 10 comprising a force sensor 30.

Preferably, the force sensor 30 is a piezoelectric force sensor. A piezoelectric force sensor comprises a piezoelectric element, an electrode, an electrical conductor and a contact surface. Force sensor 30 measures a tool force acting onto the contact surface. The contact surface is made of mechanically resistant material and is cylindrical or hollow cylindrical in shape. The piezoelectric element is cylindrical or hollow cylindrical in shape and consists of piezoelectric material such as quartz ($SiO_2$ monocrystal), calcium gallogermanate ($Ca_3Ga_2Ge_4O_{14}$ or CGG), langasite ($La_3Ga_5SiO_{14}$ or LGS), tourmaline, gallium orthophosphate, piezo ceramics, etc. The piezoelectric element is oriented to be highly sensitive for the tool force to be absorbed. Preferably, the piezoelectric element is oriented in a way that electrical polarization charges are generated on those surfaces onto which the tool force acts. The electrode is also cylindrical or hollow cylindrical in shape and is preferably arranged on the surface of the piezoelectric element onto which the tool force acts. The electrode picks up the electrical polarization charges as signals. The signals are proportional to the amount of the tool force. Preferably, the electrode is electrically insulated from the tool or tool holder or contact surface. Preferably, the electrode is an electrically insulating film coated with an electrically conductive material on one or both sides thereof. The electrical conductor is connected to the electrode and transmits the signals from the electrode to a plug connection for a signal cable, which signal cable in turn conducts the signals to an evaluation device. Alternatively, the electrical conductor connected to the electrode conducts the signals to a radio device, which radio device in turn transmits the signals to an evaluation device via a radio link.

Tool 10 comprises a tool holder 20 and a tool shank 11. Tool holder 20 comprises a tool holding fixture 21. Tool holding fixture 21 is adapted to accommodate the tool shank 11. For this purpose, the tool holding fixture 21 has an indentation 22 and a wedge 23 which may be adjusted by means of a clamping screw 24 to exert a clamping force onto the tool shank 11 when the tool shank 11 is accommodated in the indentation 22. The tool holder 20 may be secured to a tool slide (not shown) by means of securing screws 25.

The force sensor 30 is arranged in a recess 12 at the tool shank 11. Recess 12 is manufactured in a mechanically resistant material. The material is either the tool shank 11 (FIGS. 1, 2, 7) or a tool holder 20 (FIGS. 5, 6, 9, 10) or an intermediate piece 26 (FIGS. 3, 4, 8).

The recess 12 is cylindrical or hollow-cylindrical in shape. The force sensor 30 may comprise a cylindrical or hollow cylindrical housing that is made of mechanically stable material, which housing accommodates the piezoelectric element, the electrode and the electrical conductor. Preferably, the housing is sealed by the contact surface via a material bond. The force sensor 30 is arranged in the recess 12 with the housing. The plug connection is arranged at the housing so that the signal cable is connected to the electrical conductor by the plug connection in the recess 12. Alternatively, the radio device is arranged in the housing so that the electrical conductor is connected to the radio device in the housing. However, the force sensor 30 may have no housing in which case the recess 12 accommodates the piezoelectric element, the electrode and the electrical conductor. In this case, the plug connection is arranged in the material surrounding the recess 12 so that the signal cable is connected to the electrical conductor by the plug connection in the material surrounding the recess 12. Alternatively, the radio device is arranged in the material surrounding the recess 12 so that the electrical conductor is connected to the radio device. Preferably, the recess 12 is then sealed by the contact surface via a material bond.

Figure 2:
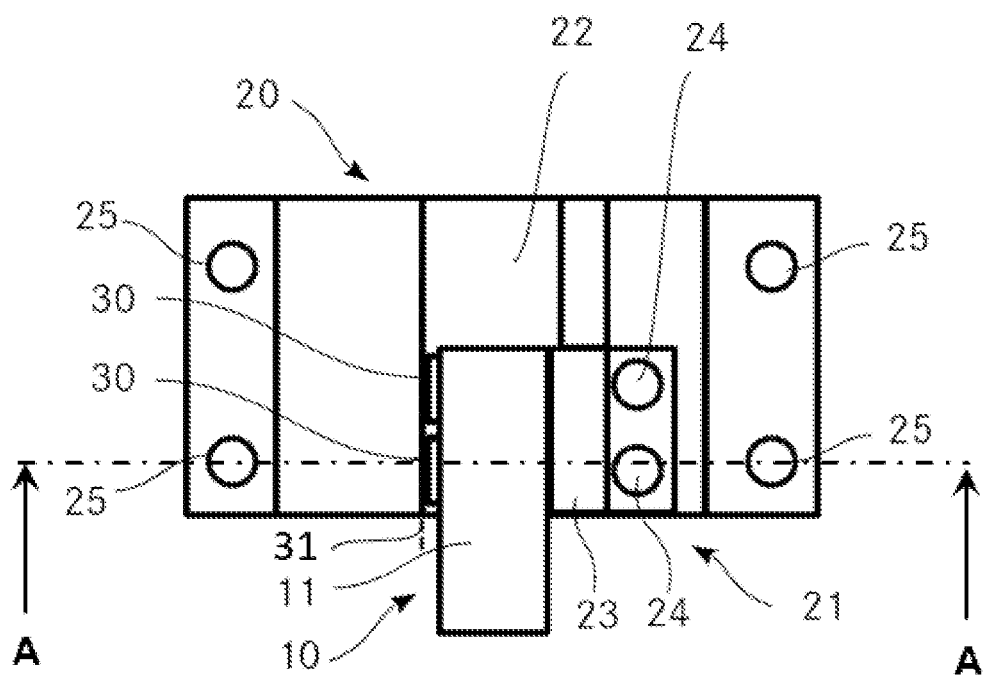
FIG. 2 shows a top view of the first embodiment of the tool of the invention according to FIG. 1.

In the first embodiment of the tool 10 as shown in FIGS. 1 and 2, the force sensor 30 is not completely accommodated within the recess 12 in the tool shank 11. In the context of the present invention, not completely accommodated within the recess 12 in the tool shank 11 means that in some areas the contact surface of the force sensor 30 projects beyond the tool shank 11. A contact surface of the tool holder 20 and the contact surface of the force sensor 30 abut against one another in a contact plane 31, which is schematically indicated by the dashed line in FIG. 1 and FIG. 2. In the contact plane 31, a mechanical contact between the tool shank 11 and the contact surface of the tool holder 20 is made solely by the contact surface of the force sensor 30. In this first embodiment of the tool 10 shown in FIG. 1 and FIG. 2 for example, the force sensor 30 measures 100% of the tool force exerted onto the contact surface of the force sensor 30 by the contact surface of the tool holder 11. A force component of the tool force measured is 100%. This has the advantage that the force is measured with maximum sensitivity since no force component acts in a force shunt outside of the force sensor 30. Preferably, the tool shank 11 has a square cross-section. It can be seen in the top view according to FIG. 2 that the tool 10 may also comprise two force sensors 30.

Figure 3:
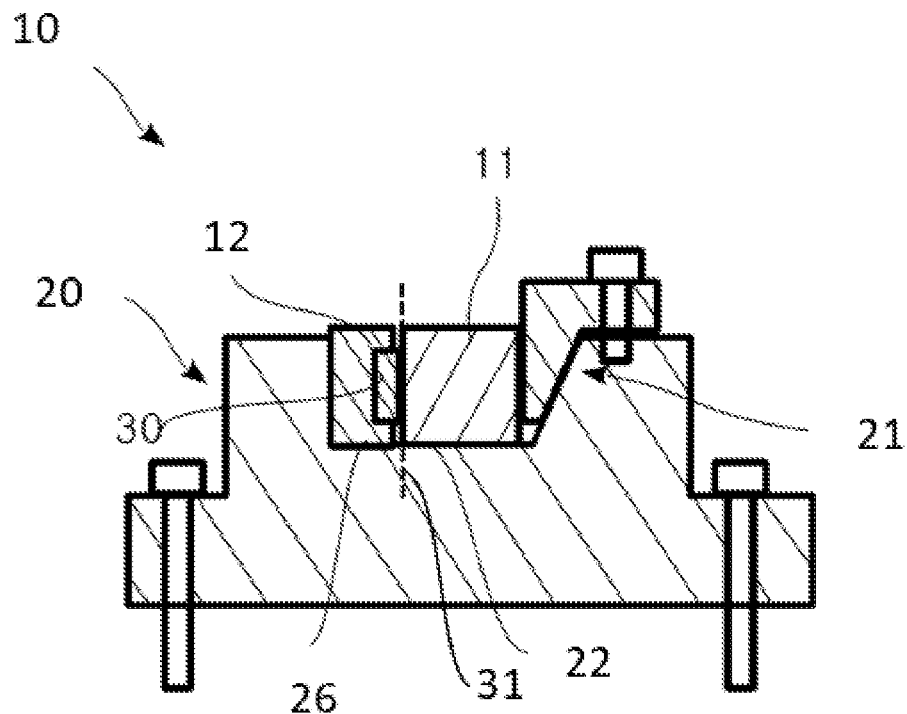
FIG. 3 shows a cross-section taken in the direction of the arrows B-B in FIG. 4 of a second embodiment of the tool according to the invention having a recess for the pressure sensor located in an intermediate piece wherein solely a contact surface of the pressure sensor abuts on the tool shank.
Figure 4:
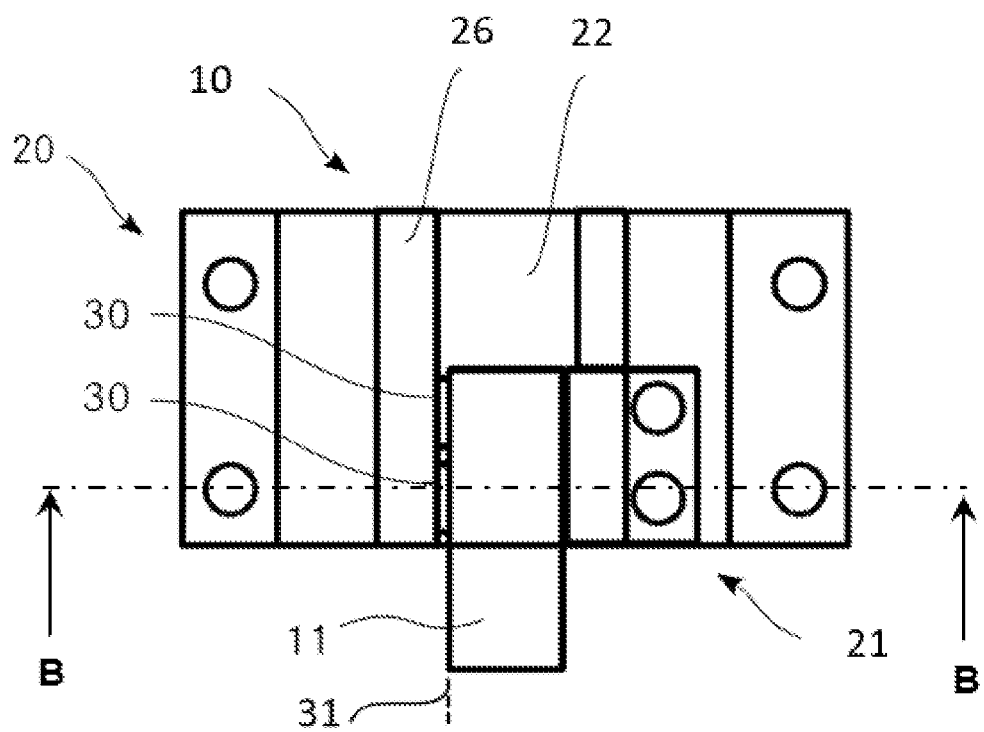
FIG. 4 shows a top view of the second embodiment of the tool of the invention according to FIG. 3.

In the second embodiment of the tool 10 as shown in FIGS. 3 and 4 the force sensor 30 is not completely accommodated within the recess 12 in the intermediate piece 26.

As compared to the first embodiment of the tool 10, the second embodiment of the tool 10 comprises a tool holding fixture 21 having a wider indentation 22. This wider indentation 22 not only provides space for the tool shank 11 but also for the intermediate piece 26. In this case, the force sensor 30 is not completely accommodated within the recess 12 in the intermediate piece 26. In the context of the present invention, not completely accommodated within the recess 12 in the intermediate piece 26 is intended to mean that some portion of the force sensor 30 protrudes beyond the intermediate piece 26. A contact surface of the tool shank 11 and the contact surface of the force sensor 30 abut against one another in a contact plane 31. In the contact plane 31, a mechanical contact between the intermediate piece 26 and a contact surface of the tool shank 11 is made solely over the contact surface of the force sensor 30. In this second embodiment of the tool 10, the force sensor 30 measures 100% of the tool force exerted by the contact surface of the tool shank 11 onto the contact surface of the force sensor 30. A force component of the tool force measured is 100%. This has the advantage that the force measurement is performed with maximum sensitivity since no force component acts in a force shunt outside of the force sensor 30. In the top view according to FIG. 4 the wider indentation 22 is partially hidden by the intermediate piece 26. However, it can be clearly seen that two force sensors 30 arranged in the intermediate piece 26 are in operative connection with the tool shank 11.

Figure 5:
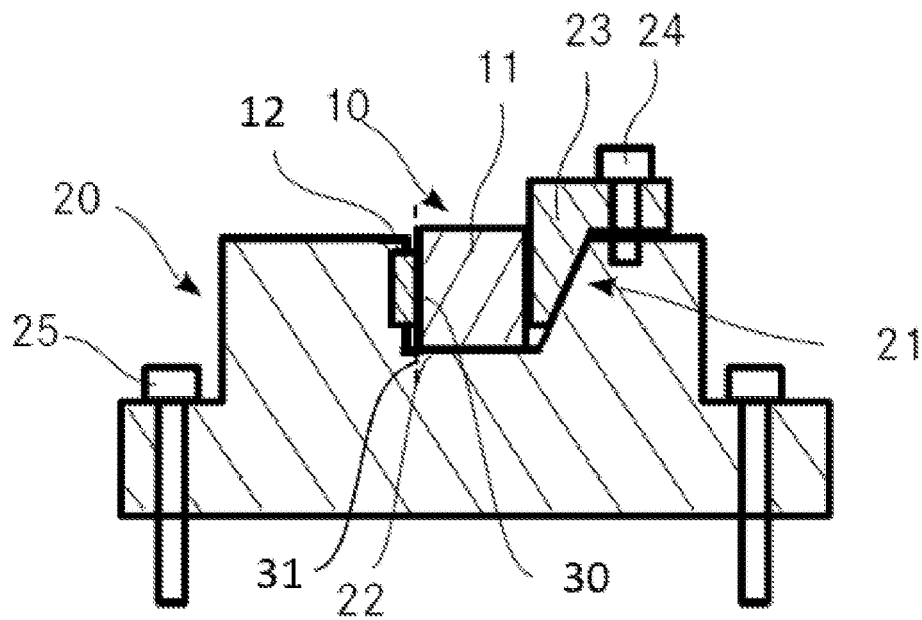
FIG. 5 shows a cross-section of a third embodiment of the tool according to the invention having a recess for the pressure sensor located in the tool holder wherein solely a contact surface of the pressure sensor abuts on the tool shank.

In the third embodiment of the tool 10 as shown in FIG. 5, the force sensor 30 is not completely accommodated within the recess 12 in the tool holder 20. In the context of the present invention, not completely accommodated within the recess 12 in the tool holder 20 means that some portion of the force sensor 30 protrudes beyond the tool holder 20. A contact surface of the tool shank 11 and the contact surface of the force sensor 30 abut against one another in a contact plane 31. In the contact plane 31, a mechanical contact between the tool holder 20 and the contact surface of the tool shank 11 is made solely by the contact surface of the force sensor 30. In this third embodiment of the tool 10, the force sensor 30 measures 100% of the tool force exerted by the contact surface of the tool shank 11 onto the contact surface of the force sensor 30. A force component of the tool force measured is 100%. This has the advantage that the force measurement is carried out with maximum sensitivity since no force component acts in a force shunt outside of the force sensor 30.

Figure 6:
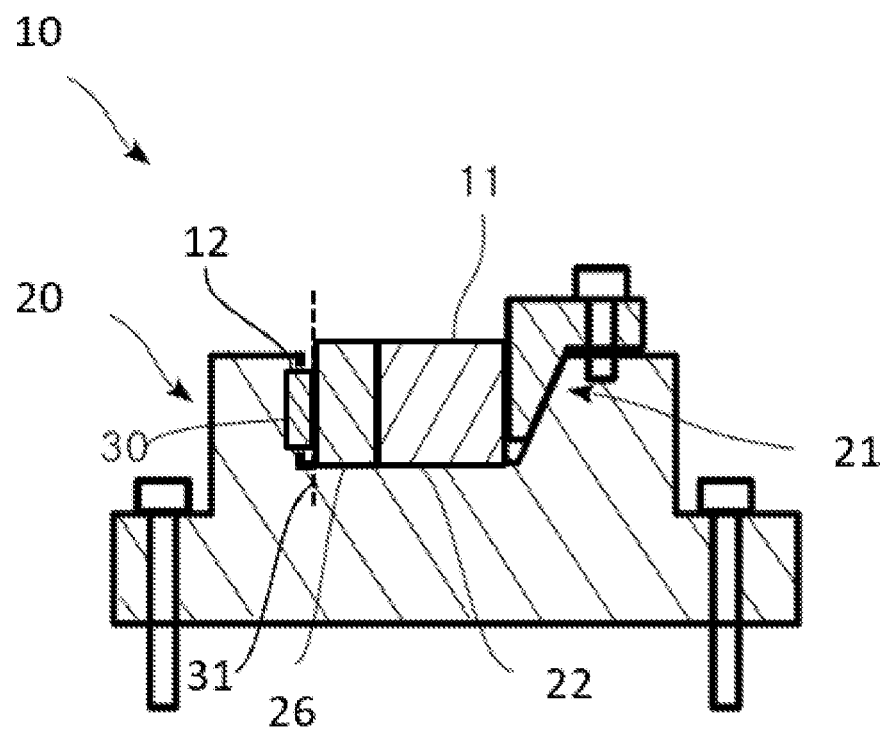
FIG. 6 shows a cross-section of a fourth embodiment of the tool according to the invention having a recess for the pressure sensor located in the tool holder wherein solely a contact surface of the pressure sensor abuts on an intermediate piece.

In the fourth embodiment of the tool 10 as shown in FIG. 6, the force sensor 30 is not completely accommodated within the recess 12 in the tool holder 20. In the context of the present invention, not completely accommodated within the recess 12 in the tool holder 20 is intended to mean that some portion of the force sensor 30 protrudes beyond the tool holder 20. A contact surface of an intermediate piece 26 and the contact surface of the force sensor 30 abut against one another in a contact plane 31. In the contact plane 31, a mechanical contact between the tool holder 20 and the contact surface of the intermediate piece 26 is made solely by the contact surface of the force sensor 30. In this fourth embodiment of the tool 20, the force sensor 30 measures 100% of the tool force exerted by the contact surface of the intermediate piece 26 onto the contact surface of the force sensor 30. A force component of the tool force measured is 100%. This has the advantage that the force measurement is carried out with maximum sensitivity since no force component acts in a force shunt outside of the force sensor 30.

Figure 7:
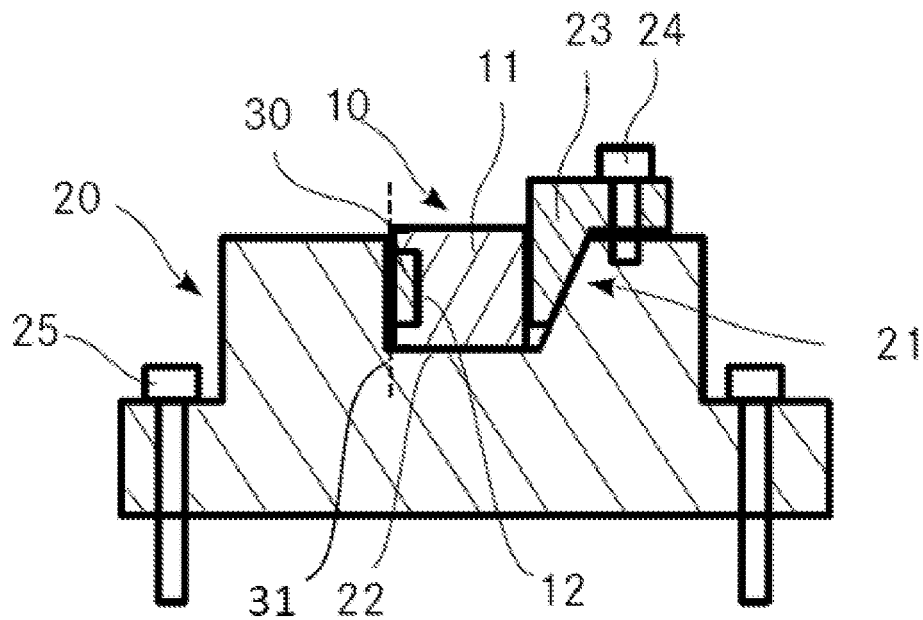
FIG. 7 shows a cross-section of a fifth embodiment of the tool according to the invention having a recess for the pressure sensor located in the tool shank wherein a common contact surface formed by the pressure sensor and the tool shank abuts on the tool holder.
Figure 8:
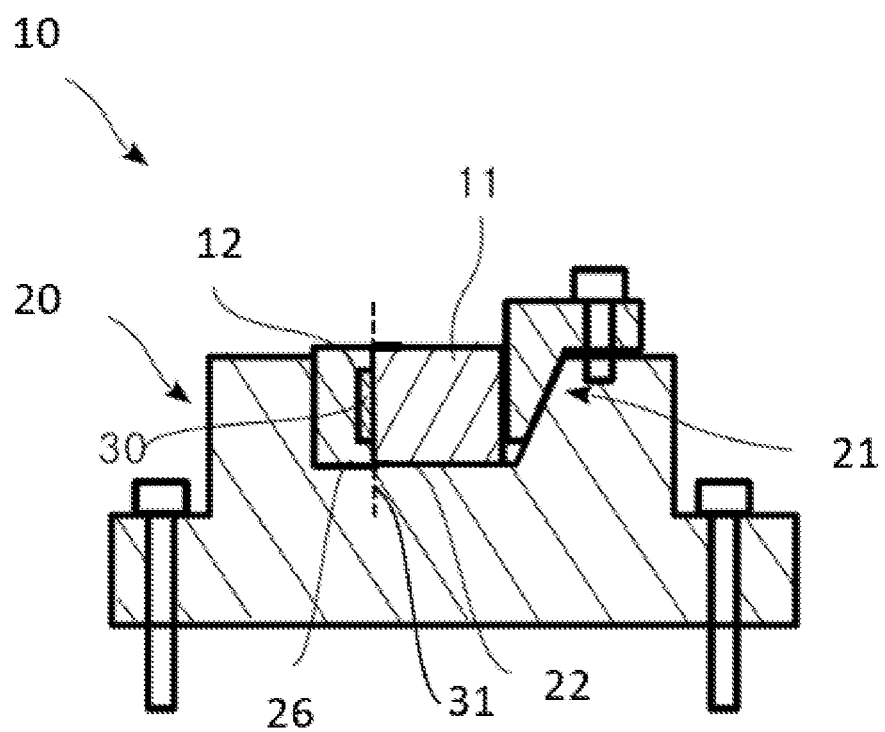
FIG. 8 shows a cross-section of a sixth embodiment of the tool according to the invention having a recess for the pressure sensor located in an intermediate piece wherein a common contact surface formed by the pressure sensor and the intermediate piece abuts on the tool shank.

In the fifth embodiment of the tool 10 according to FIG. 7, the force sensor 30 is completely accommodated within the recess 12 in the tool shank 11. In the context of the present invention, completely accommodated within the recess 12 in the tool shank 11 is intended to mean that the force sensor 30 does not protrude beyond the tool shank 11. The tool shank 11 and the force sensor 30 completely accommodated therein form a common contact surface. A first portion of the common contact surface is a contact surface of the tool shank 11 and a second portion of the common contact surface is the contact surface of the force sensor 30. The common contact surface is ground flat, for example. The common contact surface formed by the tool shank 11 and the force sensor 30 and a contact surface of the tool holder 20 abut against one another in a contact plane 31. In the contact plane 31, a mechanical contact between the tool shank 11 and the contact surface of the tool holder 20 is made by the common contact surface formed by the tool shank 11 and the force sensor 30. In the fifth embodiment of the tool holder 20 shown in FIG. 7 for example, the force sensor 30 measures less than 100% of the tool force acting on the common contact surface because there is a force shunt outside of the force sensor 30 acting from the contact surface of the tool shank 11 onto the contact surface of the tool holder 20. A force component of the tool force measured is less than 100%. This has the advantage that the force measurement is performed with high mechanical stability and high natural frequency because mechanical bending of the tool holder 20 is not possible since, advantageously, the common contact surface formed by the tool shank 11 and the force sensor 30 substantially has the same dimensions as the contact surface of the tool holder 20.

In the sixth embodiment of the tool 10 according to FIG. 8, the force sensor 30 is completely accommodated within the recess 12 in the intermediate piece 26. In the context of the present invention, completely accommodated within the recess 12 in the intermediate piece 26 means that the force sensor 30 does not protrude beyond the intermediate piece 26. The intermediate piece 26 and the force sensor 30 accommodated therein form a common contact surface. A first portion of the common contact surface is a contact surface of the intermediate piece 26 and a second portion of the common contact surface is the contact surface of the force sensor 30. The contact surface is ground flat, for example. The common contact surface formed by the intermediate piece 26 and the force sensor 30 and the contact surface of the tool shank 11 abut against one another in a contact plane 31. In the contact plane 31, a mechanical contact between the intermediate piece 26 and the contact surface of the tool shank 11 is made over the common contact surface formed by the intermediate piece 26 and the force sensor 30. In the sixth embodiment of the tool holder 20 shown in FIG. 8 for example, the force sensor 30 measures less than 100% of the tool force acting from the contact surface of the tool shank 11 onto the common contact surface because there is a force shunt outside the force sensor 30 acting from the contact surface of the tool shank 11 onto the contact surface of the intermediate piece 26. A force component of the tool force measured is less than 100%. This has the advantage that the force measurement is carried out with high mechanical stability and high natural frequency because mechanical bending of the tool shank 11 is not possible since, advantageously, the common contact surface formed by the intermediate piece 26 and the force sensor 30 has substantially the same dimensions as the contact surface of the tool shank 11.

Figure 9:
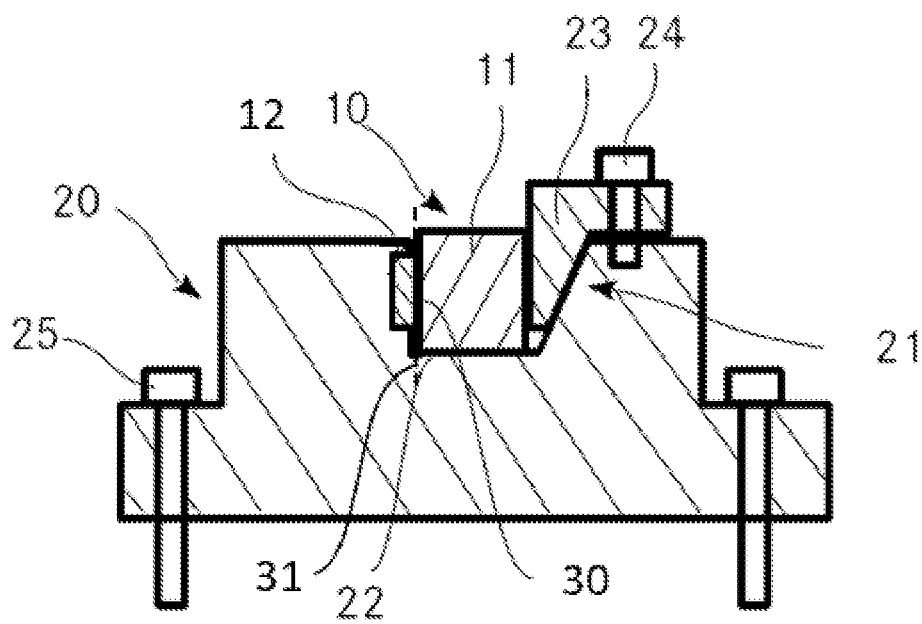
FIG. 9 shows a cross-section of a seventh embodiment of the tool according to the invention having a recess for the pressure sensor located in the tool holder wherein a common contact surface formed by the pressure sensor and the tool holder abuts on the tool shank.

In the seventh embodiment of the tool 10 according to FIG. 9, the force sensor 30 is completely accommodated within the recess 12 in the tool holder 20. In the context of the present invention, completely accommodated within the recess 12 in the tool holder 20 means that the force sensor 30 does not protrude beyond the tool holder 20. The tool holder 20 and the force sensor 30 completely accommodated therein form a common contact surface. A first portion of the common contact surface is a contact surface of the tool holder 20 and a second portion of the common contact surface is the contact surface of the force sensor 30. The common contact surface is ground flat, for example. The common contact surface formed by the tool holder 20 and the force sensor 30 and a contact surface of the tool shank 11 abut against one another in a contact plane 31. In the contact plane 31, a mechanical contact between the tool holder 20 and the contact surface of the tool shank 11 is made over the common contact surface formed by the tool holder 20 and the force sensor 30. In the seventh embodiment of the tool holder 20 shown in FIG. 9 for example, the force sensor 30 measures less than 100% of the tool force that acts onto the common contact surface because there is a force shunt outside of the force sensor 30 acting from the contact surface of the tool shank 11 onto the contact surface of the tool holder 20. A force component of the tool force measured is less than 100%. This has the advantage that the force measurement is carried out with high mechanical stability and high natural frequency because mechanical bending of the tool shank 11 is not possible since, advantageously, the common contact surface formed by the tool holder 20 and the force sensor 30 substantially has the same dimensions as the contact surface of the tool shank 11.

Figure 10:
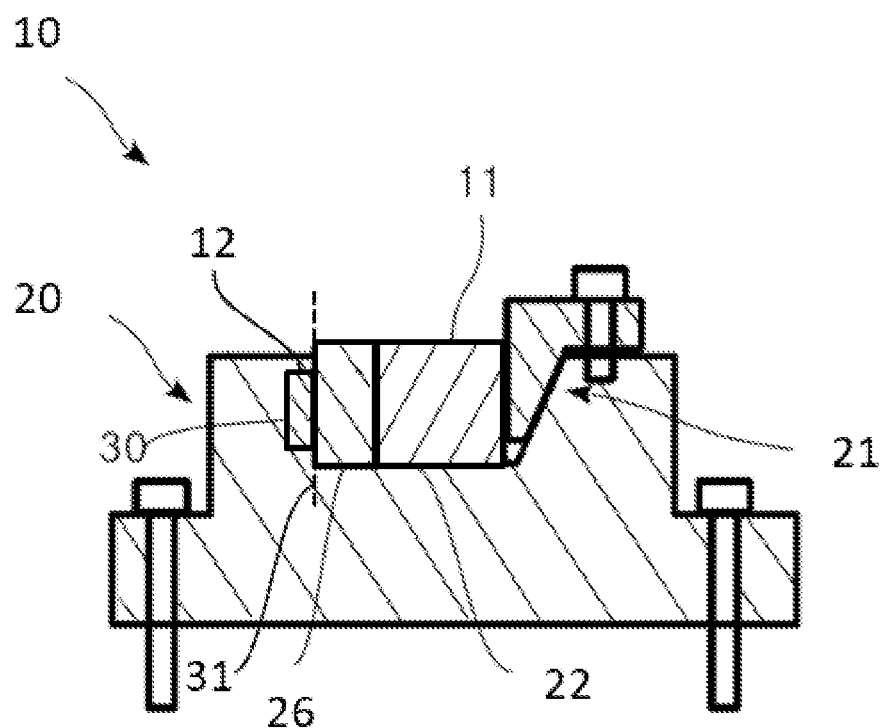
FIG. 10 shows a cross-section of an eighth embodiment of the tool according to the invention having a recess for the pressure sensor located in the tool holder wherein a common contact surface formed by the pressure sensor and the tool holder abuts on an intermediate piece.

In the eighth embodiment of the tool 10 according to FIG. 10, the force sensor 30 is completely accommodated within the recess 12 in the tool holder 20. In the context of the present invention, completely accommodated within the recess 12 in the tool holder 20 means that the force sensor 30 does not protrude beyond the tool holder 20. The tool holder 20 and the force sensor 30 completely accommodated therein form a common contact surface. A first portion of the common contact surface is a contact surface of the tool holder 20 and a second portion of the common contact surface is the contact surface of the force sensor 30. The common contact surface is ground flat, for example. The common contact surface formed by the tool holder 20 and the force sensor 30 and a contact surface of an intermediate piece 26 abut against one another in a contact plane 31. In the contact plane 31, a mechanical contact between the tool holder 20 and the contact surface of the intermediate piece 26 is made over the common contact surface formed by the tool holder 20 and the force sensor 30. In the eighth embodiment of the tool holder 20 shown in FIG. 10 for example, the force sensor 30 measures less than 100% of the tool force that acts onto the common contact surface because there is a force shunt outside of the force sensor 30 acting from the contact surface of the intermediate piece 26 onto the contact surface of the tool holder 20. A force component of the tool force measured is less than 100%. This has the advantage that the force measurement is performed with high mechanical stability and high natural frequency because mechanical bending of the intermediate piece 26 is not possible since, advantageously, the common contact surface formed by the tool holder 20 and the force sensor 30 substantially has the same dimensions as the contact surface of the intermediate piece 26.

LIST OF REFERENCE NUMERALS

- 10 tool
- 11 tool shank
- 12 recess
- 20 tool holder
- 21 tool holding fixture
- 22 indentation
- 23 wedge
- 24 clamping screw
- 25 securing screws
- 26 intermediate piece
- 30 force sensor
- 31 contact plane

The invention claimed is:

1. A tool comprising:
a tool holder that includes a tool holding fixture that is configured to receive a tool shank, wherein the tool holding fixture includes a clamping device configured for clamping a tool shank and including a wedge;
a tool shank received by the tool holding fixture;
a recess manufactured in the tool shank;
a force sensor arranged in the recess of the tool shank;
wherein the clamping device is configured for exerting a pretensioning force that is equal to a clamping force exerted by the clamping device on the force sensor; and
wherein the force sensor is configured to measure a tool force exerted by the tool shank onto the tool holder during operation of the tool.

2. The tool according to claim 1, wherein the force sensor is not completely accommodated within the recess.

3. The tool according to claim 1, wherein the tool is a cutting tool.

4. The tool according to claim 1, wherein the force sensor is a piezoelectric force sensor.

5. The tool according to claim 1, wherein wedge is disposed to effect a connection that secures the force sensor to the tool shank or that secures the force sensor to the tool holding fixture.

6. The tool according to claim 5, wherein said wedge is disposed to effect the connection in a manner that is reversible so that the wedge can be separated from the tool shank without damage to the force sensor and the tool shank or the tool holding fixture.

7. The tool according to claim 1, wherein the force sensor is configured to enable the monitoring of signals measured by the force sensor in real time.

8. A method for measuring a tool force by using a tool according to claim 1, said method comprising the steps of: arranging a force sensor between a tool shank of the tool and a tool holding fixture of a tool holder; and clamping the force sensor by means of a clamping device of the tool holding fixture.

9. The tool according to claim 1, wherein the force sensor is completely accommodated within the recess.

10. The tool according to claim 1, wherein the force sensor is a multi-axis force sensor.

11. The tool according to claim 1, wherein the clamping device includes a clamping screw that adjusts the disposition of the wedge so that the force sensor is pretensioned by an adjustable pretensioning force.

12. The tool according to claim 5, wherein the wedge is configured to be disposed in a manner that permits adjusting the clamping force applied by the clamping device such that said connection is configured to be reproducible.

* * * * *